United States Patent [19]

Linderman et al.

[11] Patent Number: 5,083,749
[45] Date of Patent: Jan. 28, 1992

[54] PLASTIC NEEDLE VALVE

[75] Inventors: Ray D. Linderman, Streetsboro; Peter C. Williams, Cleveland Heights, both of Ohio

[73] Assignee: Whitey Co., Highland Hts., Ohio

[21] Appl. No.: 647,406

[22] Filed: Jan. 29, 1991

[51] Int. Cl.$^5$ .................. F16K 41/04; F16J 15/20; F16J 15/24

[52] U.S. Cl. .................. 251/214; 251/215; 251/327; 277/110; 277/121; 277/190

[58] Field of Search ............... 251/214, 215, 218, 221, 251/223, 225, 264, 273, 327; 277/110, 112, 117, 121, 190, 191, 116.6, 118

[56] References Cited

U.S. PATENT DOCUMENTS

| | | | |
|---|---|---|---|
| 416,058 | 11/1889 | Grob | 277/110 |
| 1,182,359 | 5/1916 | Dies | 277/110 |
| 3,032,310 | 5/1962 | Hansen | 251/327 |
| 3,145,010 | 8/1964 | Karr, Jr. | 251/214 |
| 3,443,789 | 5/1969 | Glasgow et al. | 251/214 |
| 3,512,753 | 5/1970 | Weise | 251/327 |
| 3,753,569 | 8/1973 | Bonomi | 277/117 |
| 3,938,779 | 2/1976 | Benjamin | 251/327 |
| 4,558,874 | 12/1985 | Williams et al. | 251/214 |
| 4,592,534 | 6/1985 | Ueda et al. | 251/327 |
| 4,630,629 | 12/1986 | Nimberger | 251/214 |

FOREIGN PATENT DOCUMENTS

| | | | |
|---|---|---|---|
| 15814 | of 1889 | United Kingdom | 277/110 |
| 8609 | of 1908 | United Kingdom | 277/110 |

Primary Examiner—George L. Walton
Attorney, Agent, or Firm—Fay, Sharpe, Beall, Fagan, Minnich & McKee

[57] ABSTRACT

A plug-type, rising stem needle or shut-off valve for controlling fluid flow comprises a valve housing forming a valve chamber with inlet and outlet ports connecting therewith. A bonnet member with a cylindrical passage joins with the valve chamber and opens to the exterior of the valve. A plug valve element is mounted in the chamber and adapted to be moved by an operating stem axially movable within the cylindrical passage. The stem includes a radially extending guide flange. For sealing about the operating stem and limiting the axial outwardly movement of the stem there is an assembly which includes a wall surface that defines a conical chamber at the outer end of the cylindrical passage. The conical chamber tapers from a large diameter at the axial outer end to a smaller diameter at the axial inner end. At the axial inner end of the conical chamber is a cylindrical counterbore carrying a stop ring which forms a radial shoulder for engaging the flange on the stem at a predetermined outer limit position. The stop ring has an axial outer end surface that defines a continuation of the conical chamber. A sealing ferrule is positioned in the conical chamber. The ferrule has a continuous radial outer surface which sealingly engages both the wall surface which defines the conical chamber and the axial outer end surface of the stop ring.

15 Claims, 2 Drawing Sheets

PLASTIC NEEDLE VALVE

BACKGROUND OF THE INVENTION

The subject invention is directed toward the valve art and, more particularly, to an improved rising stem plug valve.

The invention is particularly suited for manufacture as a molded, all plastic or suitable resin (e.g., perfluoroalkylvinylether or tetrafluoroethylene) valve and will be described with reference thereto; however, it should be understood that the invention can be embodied in many specific forms and manufactured from a variety of materials.

Valves used in systems handling highly corrosive acidic or caustic solutions are frequently formed entirely from molded plastics or similar resinous materials such as tetrafluoroethylene. There has been an ongoing attempt to simplify the design and manufacture of such valves. Typically, the focus has been on reducing the number of components. For example, by combining what were previously separate parts into single piece moldings there has resulted substantial savings in manufacture and assembly. However, in some instances, the component combining has not produced the most efficient or effective valve from an operating or functioning standpoint.

BRIEF STATEMENT OF THE INVENTION

The subject invention produces a highly simplified valve structure which can be formed from molded components with the critical stem seal and stem stop functions performed in a highly effective manner by separate but simple structurally and functionally interrelated components.

In particular, and in accordance with the invention, there is provided a plug-type, rising stem shut-off valve for controlling fluid flow which comprises a valve housing defining a valve chamber with inlet and outlet ports connecting therewith. A bonnet member is joined to the housing and defines a cylindrical passage aligned with the valve chamber and opening to the exterior of the valve. Positioned in the valve chamber for movement between a closed first position and an second open position is a plug valve element. The valve element is adapted to be moved between the first and second positions by an axially movable operating stem slidably mounted to extend axially within the cylindrical passage. The stem includes a radially extending flange positioned within the passage during movement between the first and second positions. Of importance to the invention is the means provided for sealing about the operating stem and limiting the axial outwardly movement of the stem as it approaches the second position. Specifically, the means preferably include a wall surface which defines a conical chamber at the outer end of the cylindrical passage. The conical chamber tapers from a larger diameter at the axial outer end to a smaller diameter at the axial inner end. A cylindrical counterbore is formed at the axial inner end of the conical chamber. Positioned in the counterbore is a stop ring which forms a radial shoulder for engaging the flange on the stem at a predetermined outer limit position. The stop ring has an axial outer end surface which is inclined and forms a continuation of the wall surface that defines the conical chamber. A sealing ferrule is positioned in the conical chamber. The ferrule has a continuous radial outer surface which sealingly engages both the wall surface which defines the conical chamber and the axial outer end surface of the stop ring.

Preferably, and in accordance with a more limited aspect of the invention, both the stop ring and the ferrule have cylindrical radial inner surfaces which slidably engage the stem. Additionally, the ferrule is compressed axially into sealing engagement with the stop ring and also moves radially into sealing engagement with the surface of the stem.

In accordance with a further aspect of the invention, the compression on the ferrule to move it into sealing engagement with the surface of the stop member and the surface of the stem is provided by a bonnet nut member which is threadedly engaged with the bonnet for axial movement relative to the bonnet and the cylindrical passage.

Preferably, all of the above described components are formed from a suitable resinous material or plastic, e.g., nylon, polytetrafluoroethylene or the like.

The arrangement described allows sealing of the stem where it enters the bonnet to be accomplished readily while providing proper guiding of the stem and stopping of the stem at the maximum outer position. The arrangement is such that the stem cannot be inadvertently removed from the valve during a valve opening operation. Additionally, by subdividing the stem sealing and stem stopping functions between the two separate elements, i.e., the stop ring and the seal ring, better performance is achieved for both stopping and sealing functions. Additionally, the stop ring can be formed from a harder material such as for example a filled Teflon or the like. Moreover, the stop point can be varied between different valves or valve models merely by changing the stop ring or the length of the noted counterbore. The use of the separate stop ring further prevents damage to the nose of the ferrule and relieves the ferrule from any significant outwardly directed forces tending to move the sealing ferrule to an open or non-sealed position relative to the conical bore in the bonnet.

As can be seen from the foregoing, a primary object of the invention is the provision of a molded plastic valve wherein the stem sealing and stop functions are performed more efficiently and effectively than in the prior art molded plastic valves.

A further object is the provision of a valve of the general type described which is simple to manufacture, assemble, and use.

Yet another object is the provision of a valve of the type described wherein the stem seal arrangement is such that sealing between the stop ring and the valve body is accomplished by the same ferrule member which seals about the stem.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED AND ALTERNATIVE EMBODIMENTS

Figure 1:
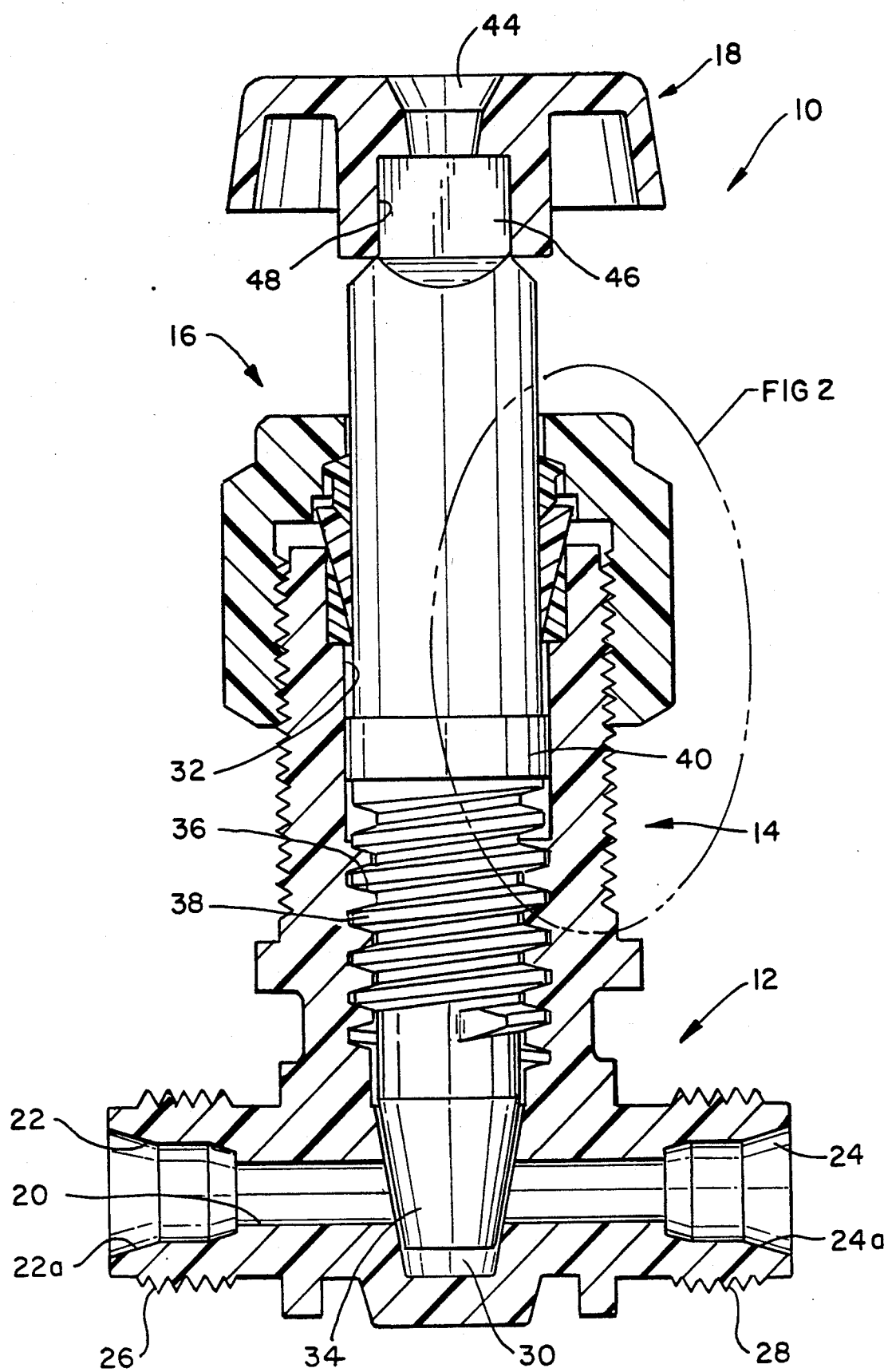
FIG. 1 is a vertical cross-sectional view through a valve embodying the preferred form of the invention.

Referring more particularly to the drawings where the showings are for the purpose of illustrating the preferred embodiment only, and not for the purpose of limiting same, FIG. 1 shows the overall arrangement of a rising stem, plug-type needle valve assembly 10 which generally comprises a body section 12 including an integral, outwardly extending bonnet portion 14 and an operating stem 16 having a handle 18. Preferably, all of the components of the valve 10 are formed from a suitable plastic or resinous material such as a PVC, PFA, nylon, or polytetrafluoroethylene. The actual selection of the material from which the valve is formed would, of course, depend upon a variety of operating parameters and environmental conditions to which the valve will be subjected. For most situations, PFA is the preferred material for all elements of the valve. However, it is to be fully understood that various combinations of suitable plastics could be substituted. Additionally, the various components are preferably formed by conventional molding techniques. Here again, however, it is to be understood that various of the components might be machined or formed using other known forming techniques.

Referring specifically to the valve body 12, it will be noted that the main portion of the body defines a through passage 20 which connects between inlet and outlet ports 22, 24. The design of this particular valve is, of course, such that either of the two ports 22, 24 can function as either an inlet port or an outlet port. That is, the valve can control flow in either direction therethrough. In the embodiment under consideration, the inlet and outlet ports are shown as having a conventional ferrule receiving conical mouth section 22a and 24a which allow the valve to be used with standard or conventional ferrule type connections. For this purpose, the outer diameter about the inlet and outlet ports are provided with suitable threads 26, 28 for connection with the ferrule fitting nut members. It should be appreciated that any of a variety of other types of connectors and end fittings could be provided on the valve body.

The through passage 20 connects with a transversely extending valve chamber 30 formed centrally within the valve body 12. In the subject embodiment, the valve chamber 30 has a truncated conical configuration and its axis intersects and extends generally perpendicular to the axis of the through passage 20. The previously mentioned bonnet portion 14 is generally cylindrical in shape and extends substantially perpendicular to the through passage 20 in axial alignment with the valve chamber 30. Additionally, the bonnet portion 14 defines an inwardly extending cylindrical chamber 32 which opens outwardly and forms a continuation of the upper end of the valve chamber 30.

In the subject embodiment, the operating stem 16 is an elongated generally cylindrical member and has a valve element 34 formed integrally therewith on the lower end. The valve element 34 is, as can be seen, of truncated conical configuration and corresponds substantially exactly in shape with the valve chamber 30 but has a shorter overall length. Accordingly, when the valve element 34 is in the lower position illustrated in FIG. 1, it sealingly engages the wall of the valve chamber to prevent flow through the through passage 20. When moved vertically away from the walls of the chamber, however, flow can take place. The stem assembly 16 and its integral valve element 34 are, as noted earlier, formed from a molded plastic as a one piece structure.

The means for producing movement of the valve element in the bonnet's and chamber 30 comprise cooperating threads formed on the exterior of the lower portion of the stem and on the interior of the lower portion of the cylindrical passage 32. Preferably, and as illustrated in FIG. 1, the cooperating threads 36, 38 have an acme form and a relatively close fit to provide a proper feel for operation of the valve. Immediately above the threads 38 on the stem 16 is a radially extending flange or collar portion 40 which is also preferably molded integrally with the stem assembly 16. The collar 40 has a cylindrical outer shape and size so as to closely but slidably engage the inner wall of the outer end portion of the cylindrical passage 32. This collar 40 provides further guidance for the stem assembly and, in a manner subsequently to be described, provides an outer limit stop for movement of the stem.

Although many different arrangements could be used for rotating the stem and driving it between its first closed position and its outermost open position, the subject device incorporates a simple molded plastic handle 18 which is connected to the outer end of the stem 16 by a screw member 44. Cooperating non-circular end portions 46 and 48 provide a driving connection between the handle 18 and the stem assembly 16. In the embodiment illustrated, the end portion 46 has a rectangular or square shape and the handle is provided with a corresponding inwardly extending rectangular opening 48.

Figure 3:
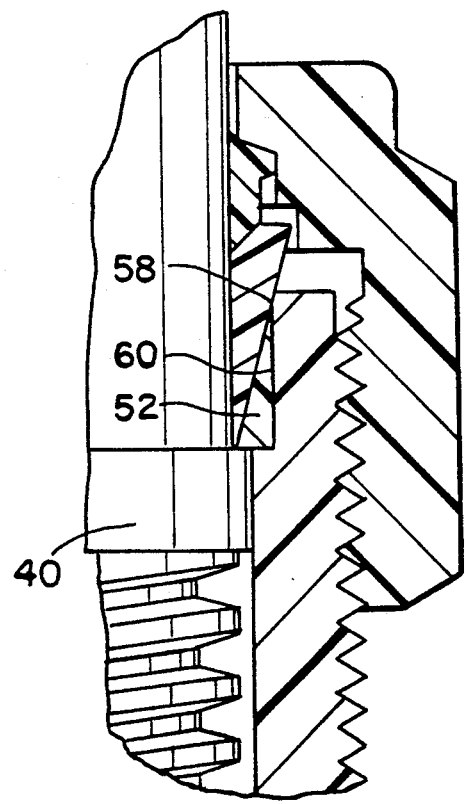
FIG. 3 is view similar to FIG. 2 but showing the valve in its full open or the outer stopped position of the actuating stem; and, FIG. 4 is an exploded side elevational view (partially in cross-section) showing the stop and seal elements in their general orientation relative to the outer end of the bonnet section of the valve.
Figure 4:
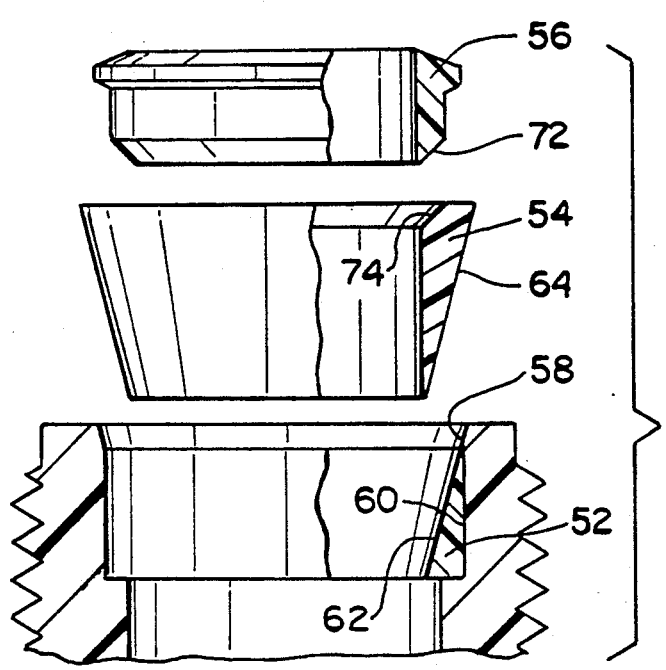

Of particularly importance to the subject invention is the arrangement for providing an outer stop limit and sealing for the stem 16. The arrangement used in the subject device can best be understood by reference to FIGS. 2 through 4. As shown therein, the stop and seal assembly includes a stop ring member 52 and an associated ferrule member 54. A second locating and sealing ferrule 56 is also associated therewith. According to the arrangement shown, the outer end of the passageway 32 is provided with a generally conical configuration as identified with the numeral 58. The conical configuration or outer mouth portion 58 has a cylindrical counterbore 60 formed at the axial inner end thereof. The stop ring 52 is sized and configured to be closely received within the counterbore 60 in the manner shown. It will be noted that the axial outer and radial inner surface 62 of the stop ring 52 is of conical configuration and forms a continuation of the conical surface 58. The ferrule member 54 has an inner diameter to slidingly and relatively closely engage about the outer surface of the outer end portion of stem 16. The radial outer and axial inner surface 64 of the ferrule 54 is, however, inclined at an angle generally corresponding to, or slightly less than, the angle of surfaces 58, 62. Additionally, the axial length of the ferrule member 54 is such that when the ferrule is in the located position shown in FIGS. 2 and 3, it extends completely over the mating line between the cylindrical outer wall of the ferrule 52 and the radial outer wall of the counterbore 60. Thus, when the ferrule member 54 is driven axially into the passage 32, it sealingly engages both the inner surface of the stop ring 52 and the surface 64 to seal the juncture between these two surfaces. Additionally, the ferrule 54 acts to provide a seal along the outer surface of the stem 16 while permitting the stem to rotate and move axially there past.

In the subject embodiment, the ferrule 54 is compressed axially into the sealing position by the outer ferrule 56 and the cooperating bonnet nut member 70. The inner ferrule 56 has the configuration best illustrated in FIG. 4 and includes a tapered forward nose portion 72 which engages within a conical recess 74 formed at the axial outer end of the ferrule 54.

The bonnet nut member 70 has a generally hex-shaped exterior surface 76 and a threaded interior 78 which engages correspondingly sized threads 80 formed about the outer surface of the bonnet portion 14 at the axial outer end thereof. Tightening of the bonnet nut onto the bonnet portion 14 causes the ferrule member 56 to be moved axially into the outer end of the ferrule 54 applying both some radial force and significant axial compressive loading thereto. This results in a sealing engagement between the ferrule 54 and the corresponding mating surfaces on the stem member 16 and the conical mouth portion 58. Additionally, the interior surface of the ferrule 56 is caused to compress radially inward toward the stem 16 because of the surfaces 72, 74. Thus, additional sealing takes place between surfaces 72, 74 and the interior of ferrule 56 and the exterior of stem 16. By tightening the bonnet nut member 76, it is possible to increase the sealing effectiveness of the ferrule 54.

It should be noted that the lower end wall of the stop ring 52 extends radially into the passageway 32 a distance so that its innermost portion is closely adjacent the outer surface of stem 16. Additionally, the bottom surface is preferably located in a plane perpendicular to the axis of the stem 16. This surface provides a stop surface for engagement with the upper surface on the flange portion 40. Thus, when the stem is in its outermost position with the valve element 34 in a full open position, engagement takes place between the flange 40 and the lower surface of the stop ring 52. This prevents engagement of the flange 40 with the nose of the sealing ferrule 54. Moreover, by subdividing the stop ring function from the seal ring function, it is possible to use a significantly harder material for the formation of the stop ring. For example, a filled polytetrafluoroethylene can be used to prevent the application of any significant unwanted loads to the ferrule 54.

Figure 2:
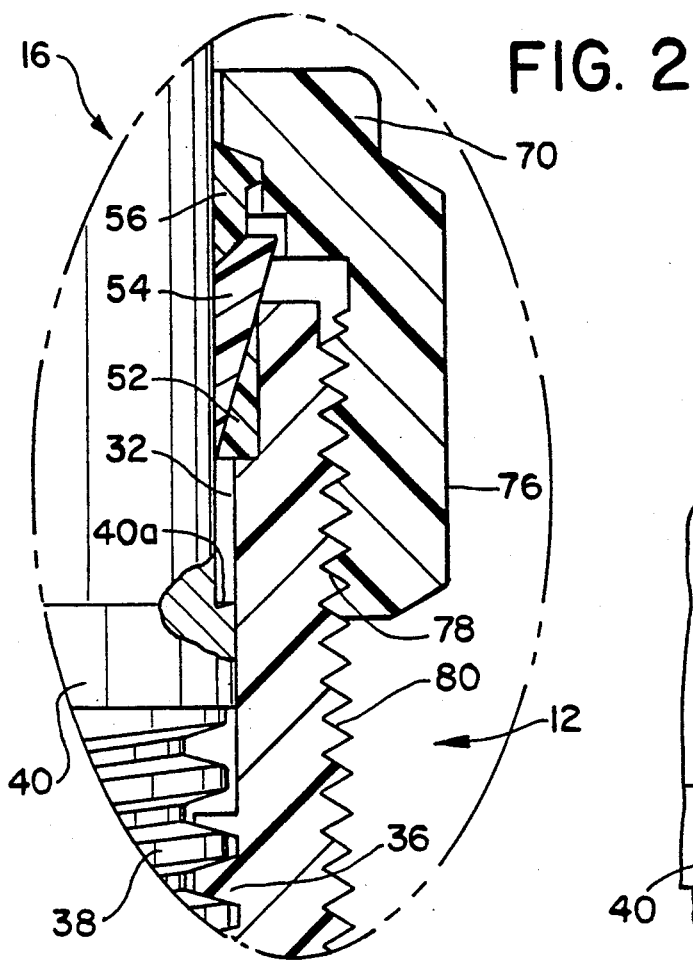
FIG. 2 is a greatly enlarged cross-sectional view showing the circled area of FIG. 1.

As best shown in FIG. 2, the top or upper surface 40a of flange 40 preferably has a slight upward slant in the range of 5 to 10 degrees to produce an inverted conical shape. This assures that contact between the flange and the stop ring 52 takes place at the surface of cylindrical passage 32. As a consequence, there is less likelihood of bending or camming the stop ring since engagement starts at the radial outer and thick portion of the stop ring rather than at its thinner inner portion.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A plug-type valve for controlling fluid flow comprising:

a valve housing defining a valve chamber with inlet and outlet ports connected therewith;

a bonnet connected with said housing and defining a cylindrical passage aligned with the valve chamber and opening to the exterior of the valve;

a plug valve element positioned in said valve chamber for movement between a first position closing said ports and second positions spaced from the ports and permitting flow through the chamber;

an axially movable operating stem extending axially of said cylindrical passage from the exterior of said valve to said valve chamber for moving said valve element between said first and second positions;

said stem having a radially extending flange positioned so as to be within said passage during movement of said stem between first and second positions;

means for sealing about said operating stem and limiting the outward axial movement of said stem, said means including a wall surface defining a chamber in said bonnet at the outer end of said cylindrical passage with the outer end of said bonnet chamber tapering from a large diameter at the outer axial end to a smaller diameter at an inner portion to form a conical chamber portion on said bonnet chamber, a cylindrical counterbore at the axial inner end of said bonnet chamber, a stop ring seated in said counterbore forming a radial shoulder for engaging the flange on said stem at a predetermined outer limit of axial movement of said stem, said stop ring having an axial outer end surface which faces radially inward and is inclined to form a continuous inclined surface with the outer end forming a continuation of the wall surface defining said conical chamber portion, and a sealing ferrule in said conical chamber portion, said ferrule having a continuous radial outer surface which sealingly engages the inclined surface of said conical chamber portion and the inclined axial outer end surface of said stop ring; and, packing gland means for applying axially directed pressure to said sealing ferrule to produce sealing by said ferrule against said inclined surface of said conical chamber portion and said stop ring.

2. The valve as defined in claim 1 wherein said stem and said cylindrical passage are provided with cooperating screw threads to produce axial movement of said stem during rotation thereof.

3. The valve as defined in claim 2 wherein said screw threads are located between said conical chamber portion and said valve chamber.

4. The valve as defined in claim 1 wherein said stop ring has a radial inner surface which slidably engages said stem and wherein said ferrule has a radial inner surface which sealing engages said stem.

5. The valve as defined in claim 4 wherein said ferrule is compressed in said conical chamber portion by a nut member connected to said bonnet.

6. The valve as defined in claim 4 wherein said stop ring is formed from a harder material than said ferrule.

7. The valve as defined in claim 4 wherein said stop ring has a cylindrical radial outer surface which is closely confined by said cylindrical counterbore.

8. The valve as defined in claim 7 wherein said stop ring completely fills said counterbore and is compressed therein by engagement of said ferrule with said axial outer end surface of said stop ring.

9. In a valve having a housing and valve element located in said housing and actuated between spaced open and closed positions by a cylindrical stem member extending through a bonnet having a bonnet passage, an improved seal and stop means for sealing about said stem and defining an axial limit of movement of said stem in a direction out of said passage, said seal and stop means including:

a generally radially extending shoulder on said stem;

an axially outwardly opening conical wall is said bonnet passage defining a conical chamber portion about said stem axially outwardly of said shoulder, a counterbore formed at the axial inner end of said conical chamber portion;

a stop ring member positioned in said counterbore, said stop ring having a radially inwardly extending axial inner end face for engaging said flange and defining the outer limit of movement of said stem, the axial outer end of said stop ring being inclined and located to form a continuation of the conical wall which defines said conical chamber portion;

a ferrule member positioned in said conical chamber portion and having a continuous tapered radial outer surface of sufficient length to extend axially outwardly beyond the stop ring and sealingly engage both said conical wall and the inclined axial outer end of said stop member; and, adjustable nut means for compressing said ferrule into said conical chamber for producing sealing engagement of said ferrule member against said conical wall and the inclined axial outer end of said stop member.

10. The valve as defined in claim 9 wherein said stop member has a cylindrical radial inner surface which closely encircles said stem.

11. The valve as defined in claim 10 wherein said adjustable nut means is movable axially relatively to said bonnet passage and is connected to said bonnet by screw threads.

12. The valve as defined in claim 10 wherein said stop ring is of annular configuration and completely fills said counterbore.

13. The valve as defined in claim 12 wherein the axial inner end face of said stop ring is circumferentially continuous and lies in a plane generally perpendicular to the axis of said stem.

14. The valve as defined in claim 9 wherein said radially extending shoulder on said stem has an upper surface which is slightly inclined to engage said stop ring adjacent the wall of said bonnet passage when said stem has moved to its axial limit of outward movement.

15. The valves as defined in claim 14 wherein said upper surface is of conical configuration.

* * * * *